United States Patent [19]
Diaz et al.

[11] Patent Number: 5,161,154
[45] Date of Patent: Nov. 3, 1992

[54] COMMUNICATION SYSTEM HAVING A VARIED COMMUNICATION RESOURCE GRANT CHANNEL USAGE REQUIREMENT

[75] Inventors: Rafael J. Diaz, Hoffman Estates; Gary W. Grube, Palatine, both of Ill.

[73] Assignee: Motorola, Inc., Schaumburg, Ill.

[21] Appl. No.: 654,146

[22] Filed: Feb. 12, 1991

[51] Int. Cl.⁵ .............................. H04J 3/16
[52] U.S. Cl. ................... 370/95.1; 370/95.3; 370/79; 370/85.7; 379/243; 340/825.03
[58] Field of Search ............... 370/95.1, 95.3, 85.7, 370/79; 340/825.03; 379/243

[56] References Cited

U.S. PATENT DOCUMENTS

| | | | |
|---|---|---|---|
| 4,199,665 | 4/1980 | Emrick et al. | 379/243 X |
| 4,460,994 | 7/1984 | Scanlon et al. | 370/85.7 |
| 4,692,945 | 9/1987 | Zdunek | 370/94.2 X |
| 4,896,313 | 1/1990 | Lespagnol et al. | 340/825.5 X |
| 5,025,254 | 6/1991 | Hess | 455/34 X |

OTHER PUBLICATIONS

European Patent Application by Harvey S. Waxman, "Resource Allocation Scheme" Published Feb. 20, 1991, filed Aug. 6, 1990, priority Aug. 15, 1989 pp. 2–10.

Primary Examiner—Douglas W. Olms
Assistant Examiner—Russell W. Blum
Attorney, Agent, or Firm—Steven G. Parmelee; Joseph P. Krause

[57] ABSTRACT

A communication system (100) that varies the channel usage requirements of its communication resource assignment grant signals to accommodate the varying needs of communication units themselves as well as accommodating current loading conditions on an assignment resource.

22 Claims, 3 Drawing Sheets

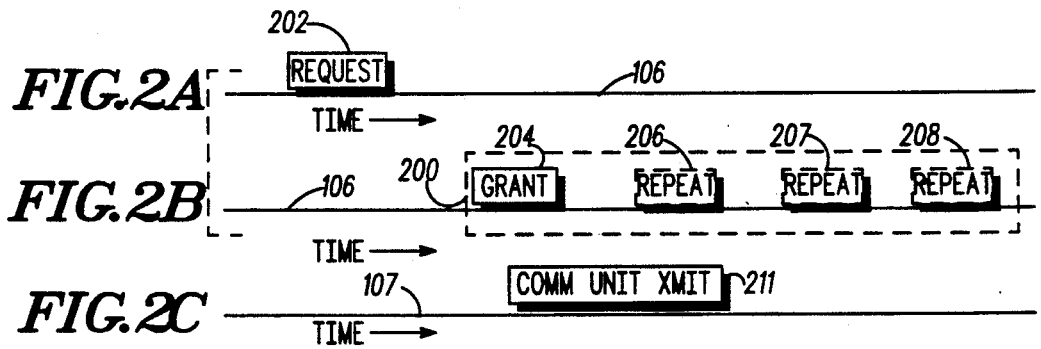
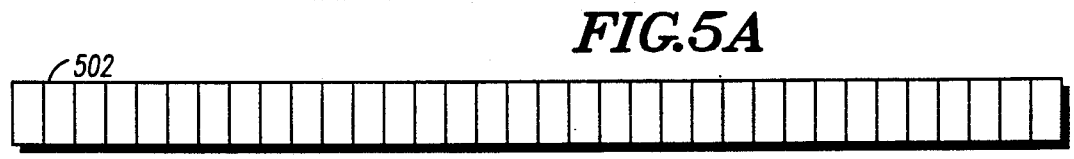
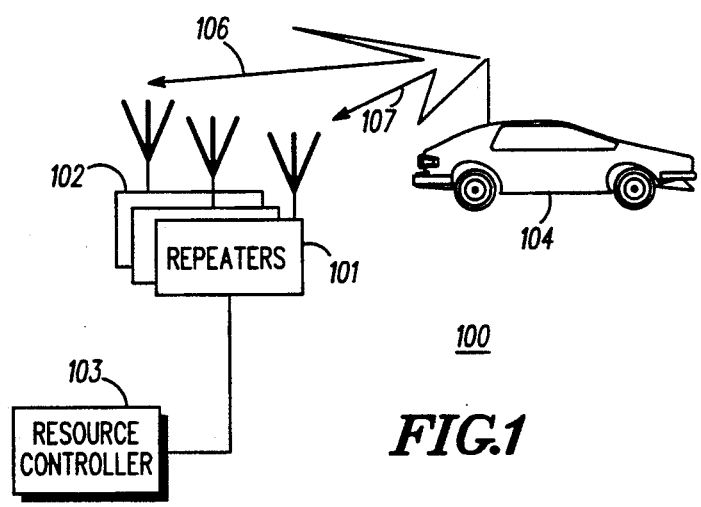

COMMUNICATION SYSTEM HAVING A VARIED COMMUNICATION RESOURCE GRANT CHANNEL USAGE REQUIREMENT

FIELD OF THE INVENTION

This invention relates generally to communication systems, including those having a plurality of communication resources that are allocated for use amongst a plurality of communication units via an assignment resource.

BACKGROUND OF THE INVENTION

Various RF communication systems are known in the art, including trunked communication systems. The latter typically administer a plurality of communication resources, often using frequency division multiplexing, time division multiplexing, and/or code division multiplexing to define a particular channel that can be assigned to support communications between various communication units. Since these communication resources typically remain undedicated to a particular unit or group, they must be assigned from time to time as needed. To facilitate the assignment process, an assignment resource is often provided. For example, one or more communication resources may be utilized as dedicated assignment resources that are used by the resource controller of the system and the various communication units to communicate with one another with respect to resource allocations. (Pursuant to another approach, the assignment resource can be combined with other communication resources; for example, control data supporting the assignment process can be subaudibly combined with voice traffic occurring on the same frequency.)

Regardless of the specific assignment resource configuration, a selection of any particular configuration or architecture will necessarily limit, at some upper level, the number of communication units that can be appropriately serviced by the communication system. For example, a typical Smartnet trunked radio system can only accommodate about 21 channels, presuming that one of these channels constitutes a dedicated control resource, leaving the remaining 20 channels to support voice and other user-to-user communications. There are applications, however, when 20 voice channels will not suffice to meet anticipated needs. For example, a particular user may require 27 voice channels to meet anticipated needs.

One prior art approach to increase system loading capabilities would be to increase the baud rate for data transmissions on the assignment resource. While this will indeed allow a greater number of channels to be accommodated by the resulting system, such a system will not be compatible with communication units already in the field, since those pre-existing units will not compatibly transceive the data having the increased baud rate.

Another prior art solution would be to simply dispense with certain currently supported messages on the assignment resource, thereby providing more time for more messages pertaining to additional channels. Simply eliminating certain classes of messages, however, typically requires that various system features be dispensed with, and this often presents an unacceptable solution.

Yet another prior art approach would be to provide more space for additional channel messages by reducing the channel requirements for currently supported messages. For example, a complete resource grant message in a Smartnet system currently constitutes an original transmission of a resource allocation signal, subsequently followed by three repetitions. By eliminating some or all of these repetitions, additional space for additional messages could of course be accommodated. Unfortunately, this approach can greatly degrade the overall performance of the system. Many communication units require some or all of the repeated resource allocation grants due to the high noise environment, RF fades, and weak signal area conditions that frequently prevail in an RF environment, and particularly a land-mobile radio communication system.

A need accordingly exists for a communication system that can support an increased number of communication resources, in a manner compatible with existing communication units, and in a manner that will not unduly compromise the operating integrity of the system.

SUMMARY OF THE INVENTION

This need and others are substantially met through provision of the communication system disclosed herein. The invention operates in conjunction with a communication system having a plurality of communication resources (such as frequencies, frequency pairs, TDM time slots, and the like) that are allocated by a resource controller, from time to time, amongst a plurality of communication units via an assignment resource. In particular, upon receiving a communication resource allocation request from a communication unit, the system determines whether the communication unit is communicating with the resource controller via a communication path having relatively high reliability. If so, a first resource grant is utilized to assign a communication resource; otherwise, a second resource grant (different than the first resource grant) is utilized to accomplish the same purpose. In accordance with the invention, the first resource grant, used when a communication path having relatively high reliability exists, has a reduced channel usage requirement as compared to the second resource grant.

In one embodiment, the low reliability resource grant includes repetitive transmission of a predetermined grant signal, whereas the high reliability grant mechanism includes fewer or no repetitions. In another embodiment of the invention, the number of repetitions for the higher reliability grant mechanism can be varied from time to time as a function of, for example, a predetermined communication system use parameter, such as a currently pending number of resource allocation requests. During peak loading conditions, it may be appropriate to minimize the number of repetitions even when servicing a communication unit using a somewhat less reliable communication path.

BRIEF DESCRIPTION OF THE DRAWINGS

FIG. 1 comprises a block diagram depiction of a communication system operating in accordance with the invention;

FIGS. 2a-c comprise timing diagrams depicting signalling between various elements of the system in accordance with the invention;

FIGS. 5a-b depict various grant signals configured in accordance with the invention.

DESCRIPTION OF A PREFERRED EMBODIMENT

Figure 3:
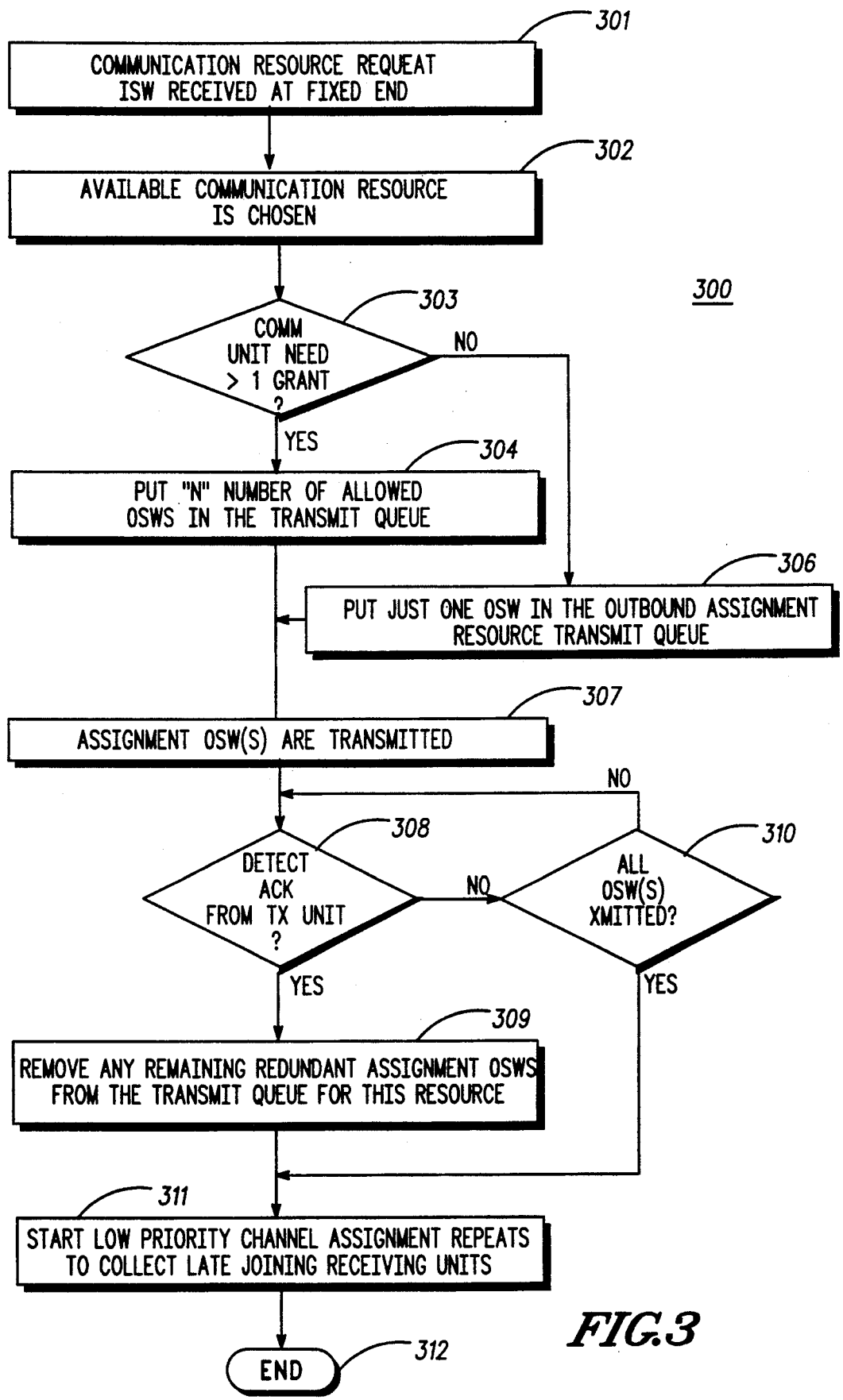
FIG. 3 comprises a flow diagram depicting one aspect of operation of the system in accordance with the invention.

A trunked communication system (100) appears in FIG. 1. The system includes a resource controller (103) that controls a plurality of repeaters (101), wherein, in this embodiment, each repeater accommodates a communication resource, such as a pair of frequencies (one for receiving and one for transmitting). In this embodiment, one of the repeaters (102) supports a dedicated assignment resource (106). The system (100) functions to support communications by and between various communication units (104) (as used herein, "communication units" refers to mobile units, portable units, and fixed location units) by providing such communication units (104) with communication resources (107) on an as-needed basis.

Such communication systems are generally well understood in the art, and hence a further detailed description will not be presented here. One suitable platform for this invention would be a Smartnet trunked radio system as sold by Motorola, Inc. A Smartnet trunked system has a resource controller (103) that includes significant computing capability and that will more than adequately accommodate the procedures set forth herein.

Before making a detailed description of the operation of the system in accordance with the invention, it will first be helpful to briefly refer to the signalling mechanism whereby a communication unit (104) obtains a communication resource (107). Referring to FIG. 2a, the communication unit (104) begins a communication by transmitting a request (202) on the assignment resource (106) to the resource controller (103). Such request (202) can be in a variety of forms, and the particular form is not relevant to this invention. Generally, the request (202) will comprise a data message that includes some identifying information with respect to the originating unit and/or a target unit or group, along possibly with information regarding the type of call to be established (dispatch, telephone interconnect, encrypted, and so forth).

Upon receiving the request (202), and presuming current availability of a communication resource (107), the resource controller (103) causes the repeater (102) to transmit on the assignment resource (106) a resource grant (200). The resource grant (200) includes an initial predetermined grant signal (204), followed by repetitions of the predetermined grant signal (206, 207, and 208). In many systems, the resource grant (200) includes an original grant signal and three repetitions, as depicted in FIG. 2b. In between the various predetermined grant signals, other signals may be inserted. The repetitions assure that a communication unit otherwise unable to receive an earlier predetermined grant signal due to various RF conditions will yet likely receive a subsequently transmitted predetermined grant signal, and therefore the desired communication may commence.

By way of background, it may also be noted that, in most systems as well as here, subsequent repetitions of the predetermined grant signal, or variations thereof, will be transmitted from time to time on the assignment resource (106) in order to accommodate other communication units that join the system later in time, or to accommodate a participating communication unit that, for whatever reason, temporarily loses the conversation in process and must return to the assignment resource (106) in order to relocate the conversation in process.

Upon receiving the predetermined grant signal, the communication unit (104) reconfigures its reception and transmission capabilities, in accordance with well known prior art technique, and begins using the assigned resource (107). In this example, this constitutes a simple transmission (211) by the communication unit (104) on the assigned resource (107).

In accordance with this invention, the communication system (100) is provided with a mechanism for selecting a particular communication resource grant scheme. To facilitate this, the system makes use of a communication grant signal having variable channel usage requirements. Beginning with FIG. 3, the operation of the system will now be described in more detail.

To begin, the resource controller (103) receives an inbound signalling word (ISW) constituting a communication resource request from a requesting communication unit (301). Presuming availability of a communication resource, the resource controller selects an available communication resource to support the desired communication (302). In one embodiment of the invention, the controller then determines whether the requesting communication unit requires more than one predetermined grant signal (303). (Criteria for determining this can vary depending upon the needs of the application. For example, the system could maintain a look-up table identifying particular communication units that are less likely to require multiple repetitions of grant signals (for example, fixed location units would be less likely to suffer RF fading and the like). As another example, the system could examine the signal quality associated with the then pending communication resource request. (Poor signal quality would suggest that more repetitions would be prudent.) If more than one grant is required for the communication unit, then the resource controller queues N number of outbound signalling words (OSWs) comprising the grant signal in the transmit queue (304). Otherwise, the controller places only one such OSW in the outbound assignment resource transmit queue (306).

The assignment OSWs are then transmitted (307) as described above with reference to FIG. 2. In particular, N number of predetermined grant signals are transmitted, with other messages likely interspersed therebetween.

The resource controller then monitors the assigned communication resource (107) to determine whether the communication unit has acquired the assigned resource (308). This can be determined by receiving, for example, a specified acknowledgement signal, a prearranged handshake signal, or by simply noting carrier activity on the assigned resource, all as may be selected depending upon the particular application.

Upon detecting acquisition of the assigned resource, the resource controller removes any remaining redundant assignment OSWs from the transmit queue for this resource (309). If acknowledgement cannot be ascertained, the controller determines whether all redundant OSWs have been transmitted (310). If not, the controller continues to monitor for assignment acquisition. At such time as all OSWs have been transmitted, however, or in the event that acquisition is detected and redundant OSWs are removed from the queue, the resource controller begins occasional repetition of low priority channel assignment signals to allow late joining communication units to be apprised of the communication, and/or to assist communication units that have lost the communication in progress to relocate the communication (311). Following this, the process concludes (312) and the resource controller may begin again as desired.

Figure 4:
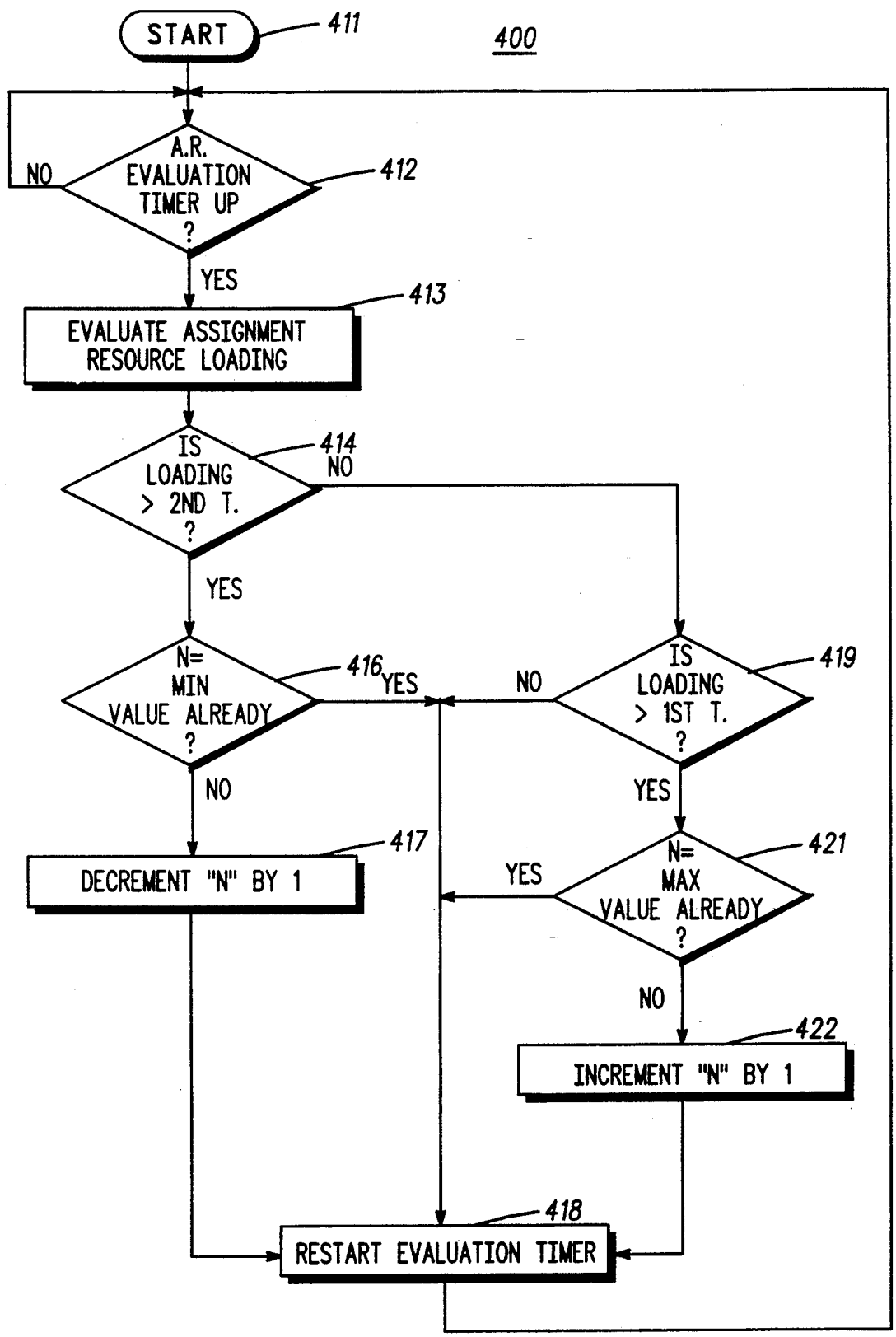
FIG. 4 comprises a flow diagram depicting operation of another aspect of the system in accordance with the invention.

In the procedure described above, at one point the controller places N number of resource grant OSWs in the transmit queue (304). In one embodiment, this number N need not be constant. Instead, this value N can vary in a manner that will now be described in detail with reference to FIG. 4. Following initiation of this procedure (411), the controller determines whether an assignment resource evaluation timer has expired (412) (activation of the timer will be noted below). If the timer has not expired, the controller simply loops back and continues to monitor for timer expiration. (When incorporating this process into an existing system, of course, one would likely conduct other necessary activities during this loop back time in accordance with well known and understood multi-tasking technique.)

When the timer expires, the controller evaluates current assignment resource loading (413). In particular, the controller considers at least one predetermined communication system use parameter, such as the number of currently pending resource allocation requests (i.e., how many requests have been made by communication units that the resource controller has not yet been able to respond to) (413). The controller then determines whether this loading factor exceeds a second threshold (414) (a discussion of a first threshold will be provided below). This second threshold may be varied as appropriate for various systems, and essentially represents a limit indicative of heavy loading, and further represents a point at which efforts should be initiated to reduce loading on the assignment resource in order to accommodate traffic conditions. If loading does exceed the second threshold, the controller determines whether the present value of N equals some pre-established minimum value, such as 1 (416). Presuming that the minimum value has not already been attained, the controller decrements N by 1 (417) and restarts the evaluation timer (418). For the next duration of the evaluation timer, the controller will then use the new value of N when conducting the process described above with reference to FIG. 3.

If the minimum value for N has already been attained (416), further decrementing of the value cannot occur, and the controller simply restarts the timer (418).

If the loading factor does not exceed the second threshold (therefore indicating that channel usage requirements are not in need of relief) (414), the controller next determines whether loading is less than a first threshold (419). If not, therefore meaning that the loading factor is somewhere between the first threshold and the second threshold, the controller simply restarts the timer (418). If, however, the loading factor is less than the first threshold (419), the controller next determines whether N has attained a maximum value already (421). If true, then N cannot be increased any further, and the timer is reinitiated (418). Otherwise, the controller increments N by 1 (422) and restarts the timer (418).

So configured, the controller will assure a maximum provision of predetermined grant signals during lightly loaded conditions, thereby assuring a high degree of reliability. Similarly, during high traffic conditions, the possible number of repetitions are reduced, albeit with some potential temporary reduction in reliability.

Pursuant to a system operating fully in accordance with the above, the number of grant signals transmitted on the assignment resource will vary as a function of both a communication unit dependent factor (such as prestored information regarding the communication unit or current signal quality as determined from the communication resource upon which the communication unit has most recently communicated its request) and as a function of overall loading of the system. The overall system functions to generally provide a resource grant of high reliability (i.e., having a greater number of repetitions) to communication units having a current need for increased reliability in this regard, while simultaneously providing a resource grant having reduced channel usage requirements (by having fewer repetitions) to the vast majority of communication units that can operate satisfactorily with such a response. By reducing the overall number of predetermined grant signals, the Applicant has determined that at least a total of 28 channels can be accommodated, wherein one of the communication resources functions as a dedicated assignment resource.

Those skilled in the art will recognize that a variety of modifications can be made with respect to the above without departing from the inventive spirit. For example, with reference to FIGS. 5a and b, another way of reducing channel usage requirements for a grant signal would be to alter the error coding for the signal itself. For example, under lightly loaded conditions as described above, a grant signal as depicted in FIG. 5b could be sent, wherein the grant signal (502) includes additional data elements to provide enhanced error correcting. During more heavily loaded conditions, however, the grant signal (501) depicted in FIG. 5a could be utilized having a fewer number of data elements and hence representing reduced error correcting facility.

By way of another example, the number N of grant signals queued could be made a function of the running average number of grant signal OSWs per second that are actually transmitted, as versus queued for transmission. In a system where a total of 42 OSWs per second can be accomodated, the averaging period could be, for example, six seconds, the first threshold could be 12 new OSWs (average value over the immediately preceeding six seconds), and the second threshold could be 27 new OSWs.

What is claimed is:

1. In a communication system having a plurality of communication resources that are allocated by a resource controller, from time to time, amongst a plurality of communication units via an assignment resource, a method of assigning a communication resource comprising the steps of:
   A) receiving a communication resource allocation request from a communication unit;
   B) determining that the communication unit is communicating with the resource controller via a communication path having relatively high reliability;
   C) when the communication unit is communicating with the resource controller via a communication path having relatively high reliability, assigning a communication resource by transmitting a first resource grant;
   D) when the communication unit is not communicating with the resource controller via a communication path having relatively high reliability, assigning a communication resource by transmitting a second resource grant, wherein the second resource grant is different than the first resource grant.

2. The method of claim 1, wherein step B further includes the steps of:
 B1) comparing a predetermined communication system use parameter with at least a first threshold;
 B2) selecting a communication resource grant scheme as a function, at least in part, of the comparison step.

3. The method of claim 1, wherein the second resource grant comprises a high reliability scheme in comparison to the first resource grant.

4. The method of claim 3, and further including the step of:
 E) truncating at least part of the resource grant when the resource controller determines that the requesting communication unit has acquired an assigned resource prior to conclusion of the communication resource grant, and otherwise automatically terminating the resource grant when the resource grant concludes in ordinary course.

5. The method of claim 3, wherein the step of communicating the first resource grant comprises transmitting a predetermined grant signal no more than a first number of times.

6. The method of claim 5, wherein the step of transmitting the second resource grant comprises transmitting the predetermined grant signal a number of times greater than the first number of times.

7. The method of claim 5, wherein the first resource grant comprises a first predetermined number of data elements.

8. The method of claim 7, wherein the second resource grant comprises a second predetermined number of data elements, which second predetermined number is larger than the first predetermined number.

9. In a communication system having a plurality of communication resources that are allocated by a resource controller, from time to time, amongst a plurality of communication units via an assignment resource, a method of assigning a communication resource comprising the steps of:
 A) receiving a communication resource allocation request from a communication unit;
 B) initiating a resource grant for an assigned resource using the assignment resource;
 C) truncating at least part of the resource grant when the resource allocator determines that the requesting communication unit has acquired an assigned communication resource prior to conclusion of the resource grant, and otherwise automatically terminating the resource grant when the resource grant concludes in ordinary course.

10. The method of claim 9, wherein the step of initiating a resource grant includes the step of repeatedly transmitting a predetermined grant signal.

11. In a communication system having a plurality of communication resources that are allocated by a resource controller, from time to time, amongst a plurality of communication units via an assignment resource, a method of assigning a communication resource comprising the steps of:
 A) receiving a communication resource allocation request from a communication unit;
 B) determining when the communication unit is communicating with the resource controller via a communication path having relatively high reliability;
 C) when the communication unit is communicating with the resource controller via a communication path having relatively high reliability, assigning a communication resource by transmitting a first resource grant;
 D) when the communication unit is not communicating with the resource controller via a communication path having relatively high reliability, assigning a communication resource by transmitting a second resource grant, wherein the second resource grant is different that the first resource grant;
 E) truncating the second resource grant when the resource controller determines that the requesting communication unit has acquired an assigned communication resource, and otherwise automatically terminating the second resource grant when the second resource grant concludes.

12. In a communication system having a plurality of communication resources that are allocated by a resource controller, from time to time, amongst a plurality of communication units via an assignment resource, a method of assigning a communication resource comprising the steps of:
 A) receiving a communication resource allocation request from a communication unit;
 B) comparing a predetermined communication system use parameter related to system loading with at least a first threshold;
 C1) providing a communication grant signal having a variable channel usage requirement; and
 C2) selecting a particular channel usage requirement.

13. The method of claim 12, wherein the step of comparing includes the step of also comparing the predetermined communication system use parameter with at least a second threshold.

14. The method of claim 13, wherein the step of selecting a particular channel usage requirement includes the steps of:
 C2a) when the predetermined communication system use parameter has a first predetermined relationship with respect to the first threshold, selecting a particular channel usage requirement that is higher than a currently selected particular channel usage requirement;
 C2b) when the predetermined communication system use parameter has a second predetermined relationship with respect to the second threshold selecting a particular channel usage requirement that is lower than a currently selected particular channel usage requirement.

15. The method of claim 14, wherein the first predetermined relationship includes the predetermined communication system use parameter being less than the first threshold.

16. The method of claim 14, wherein the second predetermined relationship includes the predetermined communication system use parameter being greater than the second threshold.

17. The method of claim 14, wherein:
 A) the first predetermined relationship includes the predetermined communication system use parameter being less than the first threshold; and B) the second predetermined relationship includes the predetermined communication system use parameter being greater than the second threshold.

18. The method of claim 12, wherein the predetermined communication system use parameter relates to a then pending number of resource allocation requests.

19. The method of claim 12, wherein the step of selecting a communication resource grant scheme includes determining a number of repetitions for transmission of a communication grant signal.

20. The method of claim 19, wherein the step of selecting a communication resource grant scheme includes selecting from zero to three repetitions of transmission of the communication grant signal.

21. The method of claim 19, wherein the step of comparing includes the step of also comparing the predetermined communication system use parameter with a least a second threshold.

22. The method of claim 21, wherein the step of selecting a number of repetitions of transmission of the communication grant signal includes the steps of:

C1) when the predetermined communication system use parameter is less than the first threshold, increasing the repetitions unless a predetermined maximum number of repetitions has already been selected;

C2) when the predetermined communication system use parameter is greater than the first threshold and less than the second threshold, maintaining a currently selected number of repetitions;

C3) when the predetermined communication system use parameter is greater than the second threshold, decreasing the repetitions unless a predetermined minimum number of repetitions has already been selected.

* * * * *